United States Patent [19]

Merrell et al.

[11] Patent Number: 5,829,038
[45] Date of Patent: Oct. 27, 1998

[54] BACKWARD INQUIRY TO LOWER LEVEL CACHES PRIOR TO THE EVICTION OF A MODIFIED LINE FROM A HIGHER LEVEL CACHE IN A MICROPROCESSOR HIERARCHICAL CACHE STRUCTURE

[75] Inventors: Quinn Merrell, Aloha; Wen-Hann Wang, Portland, both of Oreg.

[73] Assignee: Intel Corporation, Santa Clara, Calif.

[21] Appl. No.: 670,253

[22] Filed: Jun. 20, 1996

[51] Int. Cl.$^6$ .................................................. G06F 13/14
[52] U.S. Cl. ........................................ 711/143; 711/122
[58] Field of Search ................................... 395/445, 446, 395/449, 460, 470, 471, 473, 462

[56] References Cited

U.S. PATENT DOCUMENTS

| | | | |
|---|---|---|---|
| 4,020,466 | 4/1977 | Cordi et al. | 395/617 |
| 5,307,477 | 4/1994 | Taylor et al. | 395/403 |
| 5,369,753 | 11/1994 | Tipley | 395/449 |
| 5,386,547 | 1/1995 | Jouppi | 395/449 |
| 5,530,832 | 6/1996 | So et al. | 395/449 |
| 5,561,779 | 10/1996 | Jackson et al. | 395/449 |
| 5,564,035 | 10/1996 | Lai | 395/471 |
| 5,577,227 | 11/1996 | Finnell et al. | 395/449 |
| 5,581,725 | 12/1996 | Nakayama | 395/449 |
| 5,581,727 | 12/1996 | Collins et al. | 395/462 |
| 5,581,729 | 12/1996 | Nishtala et al. | 395/470 |
| 5,606,687 | 2/1997 | Mehring et al. | 395/466 |
| 5,623,628 | 4/1997 | Brayton et al. | 711/141 |

OTHER PUBLICATIONS

Baer, Jean-Loup et al. "Multilevel Cache Hierarchies: Organizations, Protocols, and Performance", Journal of Parallel and Distributed Computing, pp. 451–476, Jun. 1989.

Handy, J. The Cache Memory Book. pp. 87091, 135–137 and 247, 1993.

V. Carl Hamacher, et al., Computer Organiztion, Second Edition, 1984, pp. 306–313.

Wen–Hann Wang, et al., The 15th Annual International Symposium on Computer Architecture, On the Incclusion Properties for Multi–Level Cache Hierarchies, May 30–Jun. 2, 1988, Honololo, Hawaii, pp. 73–80.

Wen–Hann Wang, et al., The 16th Annual International Symposium on Computer Architecture, Organization and Performance of a Two–Level Virtual–Real Cache Hierarchy, May 28–Jun. 1, 1989, Jerusalem, Israel, pp. 140–148.

MindShare, Inc., et al., PCI System Architecture, Third Edition, 1995, pp. 472–480.

*Primary Examiner*—Tod R. Swann
*Assistant Examiner*—Conley B. King, Jr.
*Attorney, Agent, or Firm*—Kenyon & Kenyon

[57] ABSTRACT

A system and method for reducing the number of writeback operations performed by level two (L2) or higher level cache memories in a microprocessor system having an integrated hierarchical cache structure. Writeback operations of modified victim lines in L2 or higher level caches are cancelled if an associated cache line, having a "modified" status, is located in a lower level cache. In one embodiment of the present invention, writeback operations of modified victim lines in L2 or higher level caches are also cancelled if an associated cache line, having a "clean" status, is located in a lower level cache.

10 Claims, 3 Drawing Sheets

BACKWARD INQUIRY TO LOWER LEVEL CACHES PRIOR TO THE EVICTION OF A MODIFIED LINE FROM A HIGHER LEVEL CACHE IN A MICROPROCESSOR HIERARCHICAL CACHE STRUCTURE

BACKGROUND INFORMATION

The present invention relates generally to microprocessors with integrated cache hierarchies, and more particularly to a system and method for improving performance in an integrated hierarchical writeback caching system through the reduction of the number of writeback operations performed from second or higher level cache memories.

In microprocessor systems having integrated hierarchical cache memories, a plurality of cache memories can be coupled between a processing unit and a memory subsystem. The cache memory coupled to the memory subsystem is denoted the highest level cache, while the cache memory coupled to the processing unit is denoted the lowest level cache.

In hierarchical cache systems, when a new line of data must be brought into a particular cache memory and all the cache locations that it may occupy are full, an existing cache line must be "evicted," i.e., replaced with the new line of data. The decision as to which cache line to evict, i.e., which cache line is to be the "victim" line, is made based upon a replacement algorithm. In cache memories of the writethrough type, the victim line chosen via a replacement algorithm can be evicted without concern as to the contents of the victim line, because, in a writethrough cache memory, the contents of the cache lines always mirror corresponding information in the memory subsystem.

In cache memories of the writeback type, however, an inquiry must be made into the status of the victim line prior to its eviction. If the victim line status is "clean," then the victim line can be evicted without further concern, because the contents of the line are mirrored in a higher level cache memory and/or the memory subsystem. If, however, the victim line status is "modified," in conventional hierarchical writeback cache systems a writeback of the data in the victim line to a higher level cache or to the memory subsystem is ordinarily performed, in order to ensure that the most recent version of the data stored in the victim line is preserved elsewhere. This writeback of modified data occupies data bus bandwidth and can hinder the performance of the system if critical operations requiring the databus are waiting behind it.

If the modified victim line is contained in other than the lowest level of cache in a hierarchical cache system, it may be that an associated cache line is contained in a lower level cache in the same hierarchy. If this is the case, the lower level cache line necessarily contains the most up-to-date version of the victim line's data, and thus performing a writeback to a higher level cache or to the memory subsystem needlessly consumes databus bandwidth, thereby hindering performance. It is desired, then, to increase performance in microprocessor systems employing hierarchical cache structures by eliminating unnecessary writebacks of modified victim line data in second (i.e., L2) and higher level cache memories.

SUMMARY OF THE INVENTION

The present invention is a system and method for reducing the number of writeback operations performed by second (L2) or higher level cache memories in a microprocessor system having an integrated hierarchical cache structure.

According to the present invention, writeback operations of modified victim lines in L2 or higher level caches are cancelled if an associated cache line, having a "modified" status, is located in a lower level cache. In one embodiment of the present invention, writeback operations of modified victim lines in L2 or higher level caches are also cancelled if an associated cache line, having a "clean" status, is located in a lower level cache. In this embodiment, the status of the associated cache line in the lower level cache is updated to "modified." One advantage provided by this embodiment of the invention is that a writeback of a cache line to the memory subsystem will only be performed when the line no longer exists in any of the cache levels. Thus, an agent on the system bus which observes a writeback can infer that the line has been flushed completely out of the microprocessor's cache hierarchy. This property is important for a class of cache-coherent multiprocessor clusters having a directory-based coherency protocol which relies on this property to reset a presence (or inclusion) bit corresponding to the flushed cache line in the directory. The presence bit indicates whether or not a line is present in, e.g., a particular cluster of cache hierarchies, in a multi-cluster microprocessor system, or in a particular cache hierarchy within a particular cluster.

In an alternative embodiment of the present invention, writeback operations of modified victim lines in L2 or higher level caches are not cancelled if an associated cache line is located in a lower level cache, but has a "clean" status. In this embodiment, the writeback is allowed to continue in lieu of performing an update of the status of the associated cache line.

The present invention enhances performance of microprocessor systems having integrated hierarchical cache memories through a savings of databus bandwidth resulting from a reduction in the number of writeback operations performed by L2 or higher level cache memories.

DETAILED DESCRIPTION

Figure 1:
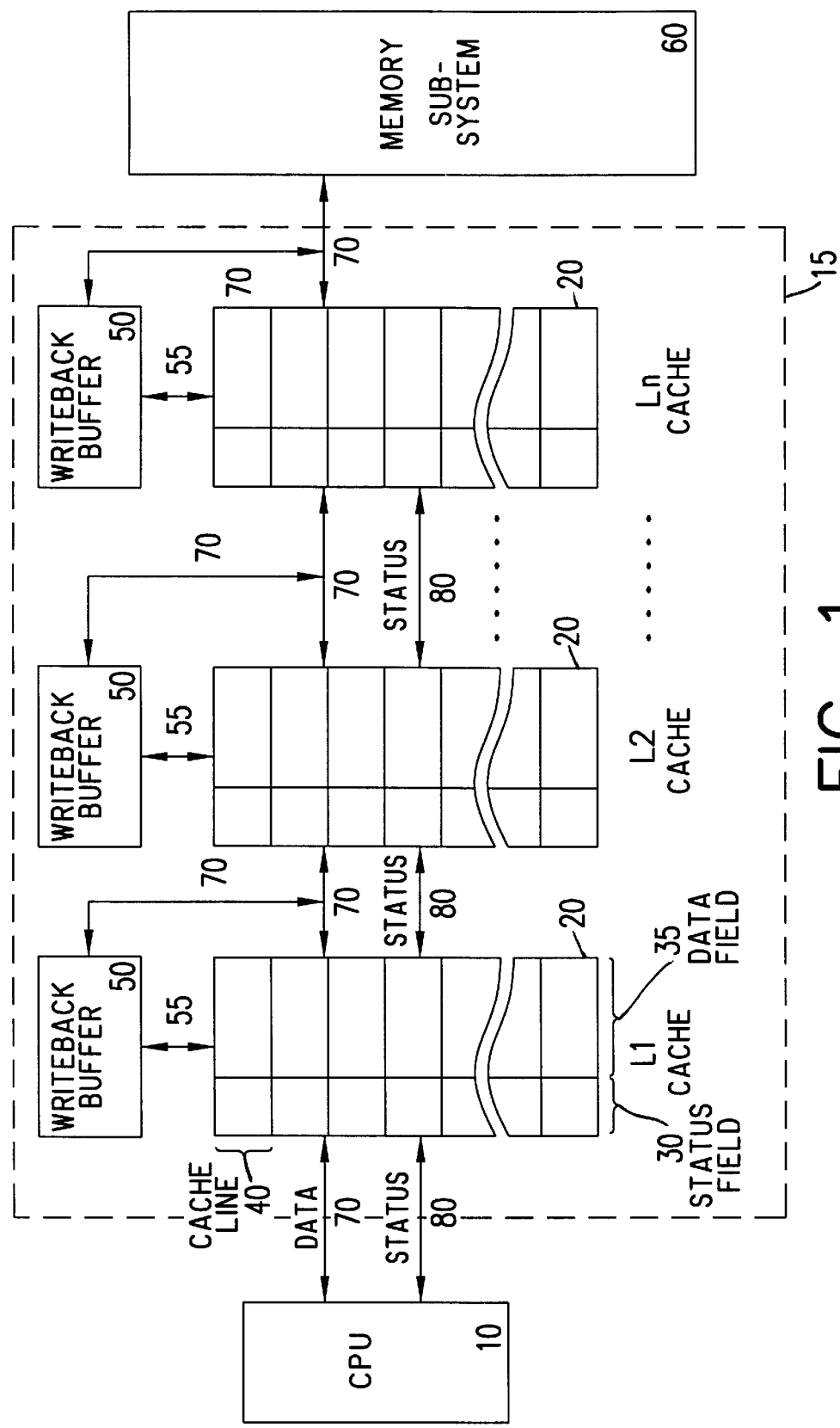
FIG. 1 depicts a microprocessor with integrated hierarchical writeback caching for performing the backward inquiry to lower level caches prior to eviction of a modified line according to the present invention.

FIG. 1 depicts a system for performing a backward inquiry to lower level caches prior to eviction of a modified line from a higher level cache in a microprocessor hierarchical cache structure according to the present invention. The processor 10 is integrated with a hierarchical cache structure 15, which is in turn coupled to a memory subsystem 60. In an integrated caching system, such as the system depicted in FIG. 1, the cache structure is dedicated to a single processor, as opposed to being shared between multiple processors.

The hierarchical cache structure 15 depicted in FIG. 1 includes two or more cache memories 20, arranged in a hierarchical fashion, such that the lowest level cache memory 20, or L1 cache 20, is coupled to the processor 10, the next highest level cache memory 20, or L2 cache 20, is coupled to the L1 cache memory 20, and so on, with the highest level cache memory 20, or Ln cache 20, in the hierarchy coupled between the second highest level cache memory 20 and the memory subsystem 60.

In the hierarchical cache structure 15 depicted in FIG. 1, each of the cache memories 20 in the hierarchy has associated with it a dedicated writeback buffer 50. It is not necessary, however, for performance of the present invention, that there be a one-to-one correspondence between the writeback buffers 50 and the cache memories 20. It is possible, for example, to have a bank of one or more writeback buffers 50, any one of which can be written to by any cache memory 20.

Each of the writeback buffers 50 in the hierarchical cache structure 15 is coupled to a corresponding cache memory 20 via buffer data lines 55. Each cache memory 20 is made up of multiple cache lines 40, each cache line 40 having a status field 30 and a data field 35. The status field 30 of each cache line 40 in the cache memories 20 contains information as to whether or not the cache line 40 has been modified.

Cache line status information is communicated between the processor 10 and the various cache memories 20 via status data lines 80. Data is written between the processor 10, the various cache memories 20, the writeback buffers 50 associated with the cache memories 20 and the memory subsystem 60 via a databus 70. As an alternative to the databus 70 configuration depicted in FIG. 1, the databus 70 can be configured, e.g., such that the writeback buffers 50 are able to write directly to the higher level cache memories 20 and/or directly to the memory subsystem 60.

In the hierarchical cache structure 15, as depicted in FIG. 1, each of the cache memories 20 contains a writeback buffer 50, and is thus capable of performing writeback caching operations. The present invention can be performed, however, with a hierarchical cache structure 15 having both writethrough and writeback caching, as long as there are at least two levels of writeback caching. Furthermore, the hierarchical cache structure 15 employed in the present invention must implement an inclusion policy which allows a cache line to be present in a lower level cache while absent in a higher level cache.

Figure 2:
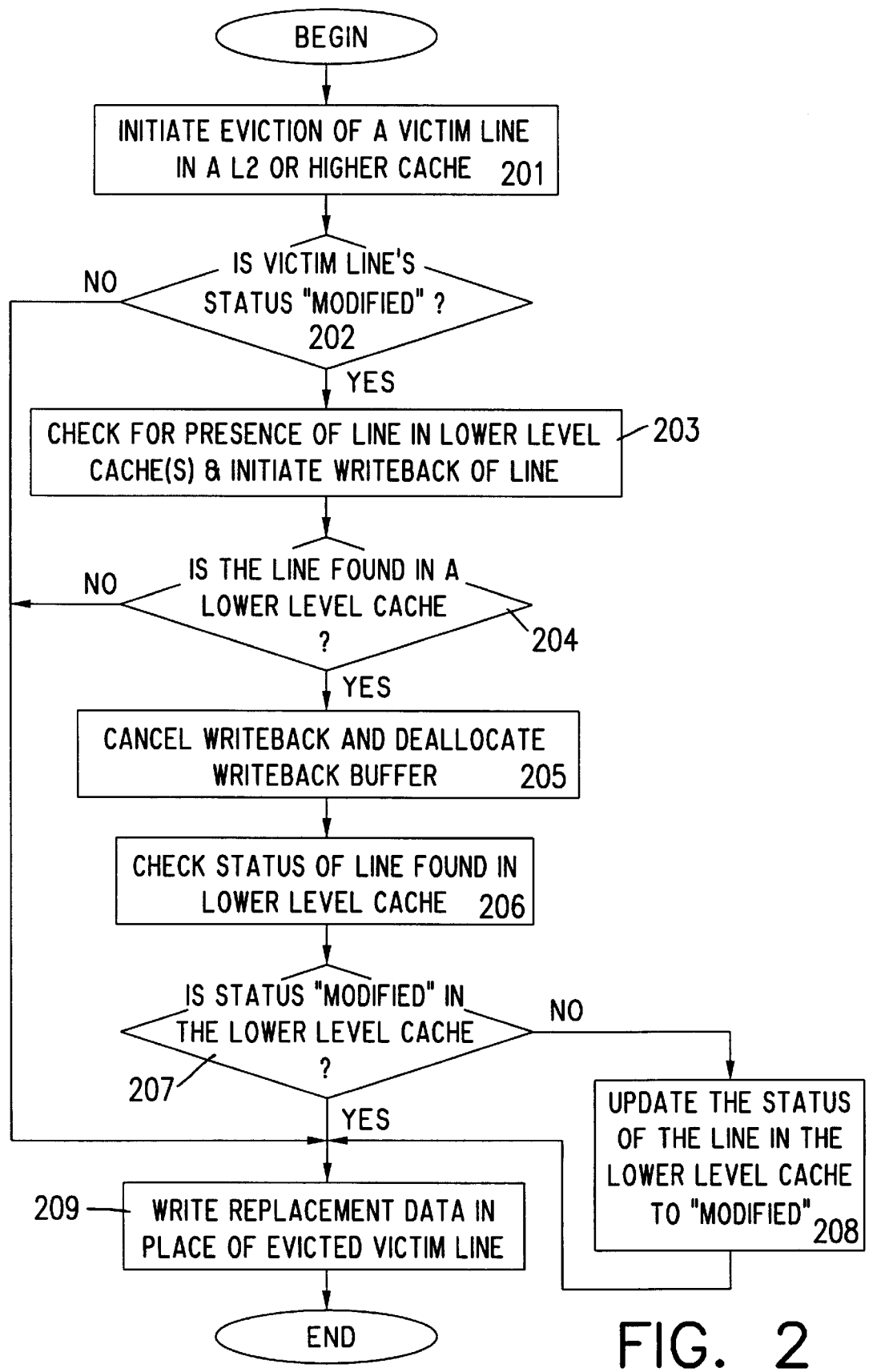
FIG. 2 is a flowchart which depicts the steps performed in performing the backward inquiry to lower level caches prior to eviction of a modified line from a higher level cache according to the present invention.

FIG. 2 is a flowchart which depicts the steps of the backward inquiry to lower level caches prior to eviction of a modified line from a higher level cache according to the present invention. In step 201, replacement of the data in a victim line from a L2 or higher level cache in a hierarchical integrated cache system is initiated. The determination as to which cache line is to be replaced, i.e., the choice of the victim line, is made based upon the particular replacement algorithm employed in the cache system. For example, a Least Recently Used (LRU) replacement algorithm can be employed. In an exemplary embodiment of the present invention, a pseudo LRU replacement algorithm, such as is used in the intel® 80486 microprocessor cache, is employed.

Once the victim line is identified, the status data associated with the victim line is read, in step 202, to determine whether the victim line is, e.g., "modified" or "clean." If the status of the victim line is "clean," indicating that the data in the victim line is mirrored in an associated line in, e.g., a higher level cache or the memory subsystem, then, in step 209, the victim line can be safely "evicted," i.e., the replacement data can be written into the victim line location.

If, however, the status of the victim line, as determined in step 202, is "modified," indicating that the data in the victim line no longer mirrors its associated line in the memory subsystem, and it may or may not mirror an associated line in a lower level cache, then, in step 203, a writeback of the data in the victim line is initiated, which includes writing the victim line's data to the cache's writeback buffer, and an inquiry is made as to the presence of an associated cache line in the lower level cache(s) in the cache hierarchy. If, in step 204, an associated cache line is not found in any of the lower level caches, then the writeback operation, initiated in step 203, is allowed to proceed, and the replacement data is written into the evicted modified victim line location, in step 209.

If, in step 204, an associated cache line is located in one or more of the lower level caches in the hierarchy, then the writeback operation, initiated in step 203, can be safely cancelled, and the writeback buffer containing the victim line deallocated, since hierarchical caches are designed such that the lowest level version of a particular cache line is always the most up-to-date version. However, although an associated cache line may be present in a lower level cache, the cache line in that lower level cache may not have a "modified" status, because, e.g., during a read-only operation on a cache line contained in other than the lowest level cache, the cache line may be copied down to the lowest level cache and its status in that lowest level cache designated as "clean" (i.e., unmodified). If the higher level version, having a modified status, of that cache line is evicted, however, and the writeback of the data in that cache line to either a higher level cache or to the memory subsystem is cancelled, then the status of the associated cache line in the lower level cache must be updated to "modified" so that, in the event of a later eviction of the cache line from the lower level cache, a writeback of the data in the cache line is initiated because the data in the cache line is no longer accurately mirrored in a higher level cache or in the memory subsystem.

Thus, if the status of the associated cache line in the lower level cache is determined, in step 207, to be "clean," then that status must be updated to "modified" in step 208. If the status of the associated cache line in the lower level cache is determined to indicate "modified," in step 207, then the status need not be updated. Finally, in step 209, the replacement data can be written in place of the modified victim line that was evicted from the higher level cache.

Figure 3:
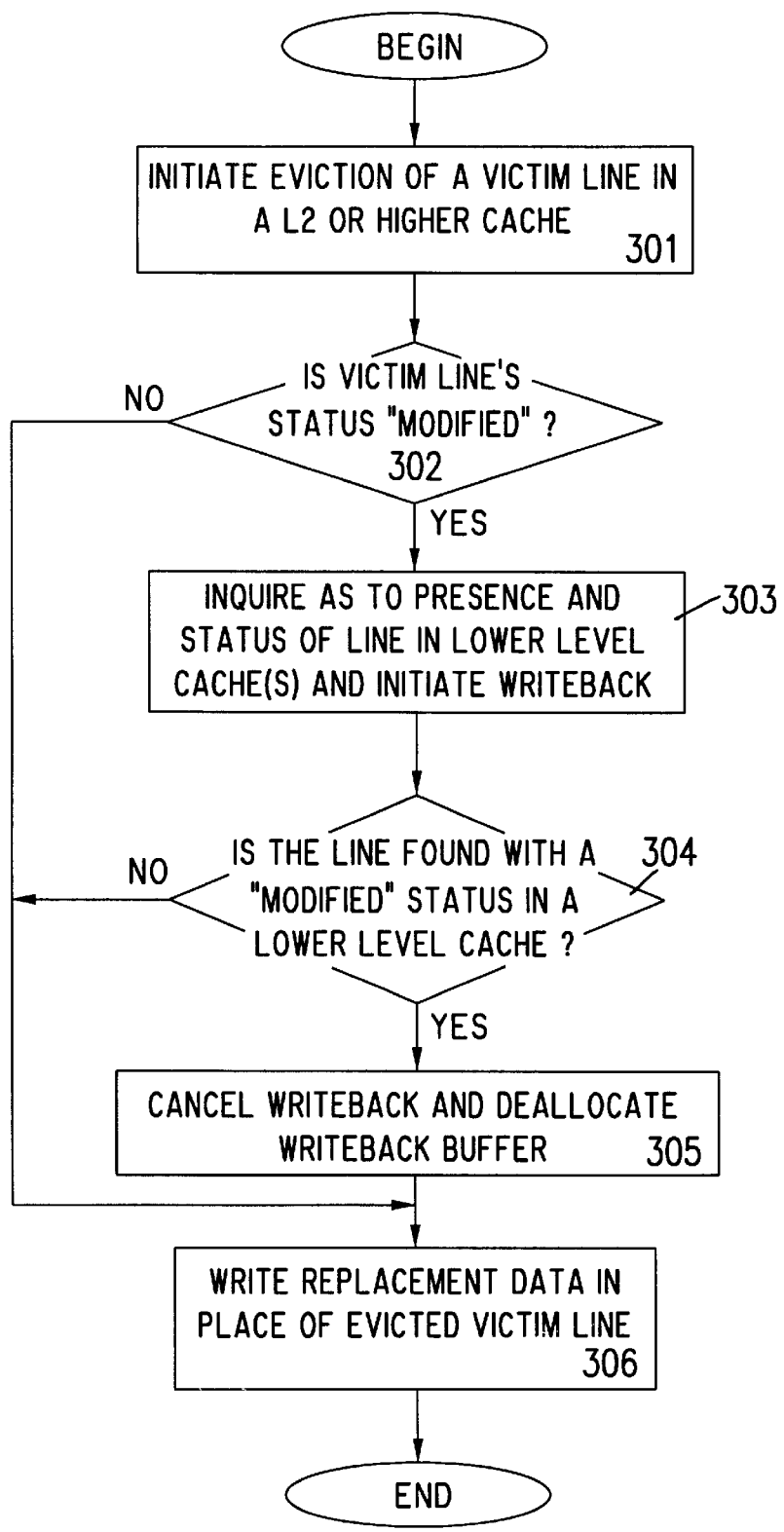
FIG. 3 is a flowchart which depicts an alternative implementation of the backward inquiry method according to the present invention in which writeback of the modified victim line is cancelled only if an associated cache line is found already having a "modified" status in a lower level cache.

FIG. 3 is a flowchart which depicts an alternative implementation of the backward inquiry method according to the present invention in which writeback of the modified victim line is cancelled only if an associated cache line is found already having a "modified" status in a lower level cache. The first two steps of the flowchart in FIG. 3, steps 301 and 302, correspond to the first two steps of the flowchart in FIG. 2, steps 201 and 202, discussed above. Thus, after initiation of the eviction of a victim line from a L2 or higher level cache in step 301, the status of the victim line is determined, in step 302. If the status indicates "clean," then the replacement data can be written into the victim line location, in step 306.

If the status indicates "modified," then, in step 303, a writeback of the data in the victim line is initiated, and an inquiry is made into the presence, as well as the status, of an associated cache line in a lower level cache. If, in step 304, an associated cache line with a "modified" status is found in a lower level cache, then, in step 305, the writeback is cancelled and the writeback buffer deallocated. However, if no associated cache line is found in step 304, then the writeback is allowed to proceed. Furthermore, in contrast to the method depicted in the flowchart of FIG. 2, if an associated cache line is found in step 304, but the associated cache line has a "clean" status, the writeback is still allowed to proceed, even though the data in the associated cache line is assumed to be the most recent version of the data. Finally, in step 306, the replacement data is written in place of the evicted victim line in the higher level cache.

The primary distinction between the embodiments of the present invention depicted in FIGS. 2 and 3 lies in the steps to be performed in the circumstance where an associated cache line for the modified victim line is located in a lower level cache, but the associated cache line has a status of "clean" rather than "modified." In the method depicted in FIG. 3, a writeback of the data in the victim line is performed in lieu of an update of the status of the associated cache line. In the method depicted in FIG. 2, however, the writeback is cancelled and the status of the associated cache line is updated. The decision as to which of these two embodiments of the present invention to implement in a given hierarchical cache system is dependent upon, e.g., the effect on system performance of performing a writeback operation from a L2 or higher level cache versus performing the state bit update of the associated cache line in the lower level cache. The choice of which embodiment to employ may also be dependent upon the cache coherence protocol employed in multiprocessor cluster systems. For example, in systems employing cache coherence protocols which trigger update of status information, such as presence (or inclusion) bits, automatically upon detection of a writeback to the memory subsystem, the embodiment of the invention depicted in FIG. 2 should be employed, as this embodiment ensures that writeback operations from a cache hierarchy to the memory subsystem are performed only if a cache line no longer exists in the cache hierarchy.

What is claimed is:

1. A method of reducing the number of data writebacks performed in a microprocessor system having an integrated hierarchical cache, in which the cache includes at least a first and a second level cache memory, each of the first and second level cache memories is coupled to at least one writeback buffer, each of the first and second level cache memories includes a data field and a status field, each status field of the plurality of cache lines in the second level cache memory is denoted as a victim cache line and has a status field which indicates a modified status, the method comprising the steps of:

(a) initiating eviction of the victim cache line in the second level cache memory;
    (b) initiating a writeback operation on the data in the data field of the victim cache line and allocating the data in the data field of the victim cache line to a writeback buffer coupled to the second level cache memory;
    (c) inquiring as to the presence of an associated cache line in the first cache memory corresponding to the victim cache line in the second cache memory;
    (d) upon locating an associated cache line in the first cache memory which corresponds to the victim cache line, determining whether the status field of the associated cache line indicates a "modified" or a "clean" status; and
    (e) if the status field of the associated cache line indicates a "modified" status, canceling the writeback operation and deallocating the writeback buffer.

2. The method according to claim 1 wherein the method further comprises the step of:

(f) writing replacement data in the data field of the victim cache line in the second level cache memory.

3. A method for reducing the number of data writebacks performed in a microprocessor system having an integrated hierarchical cache, in which the cache includes at least a first and a second level cache memory, each of the first and second level cache memories coupled to at least one writeback buffer, each of the first and second level cache memories includes a corresponding writeback buffer and a plurality of cache lines, where each of the plurality of cache lines includes a data field and a status field, each status field of the plurality of cache lines indicates one of a "modified" or "clean" status, one of the plurality of cache lines in the second level cache memory is denoted the victim cache line and has a status field which indicates a modified status, the method comprising the steps of:

(a) initiating eviction of the victim cache line in the second level cache memory;
    (b) initiating a writeback operation on the data in the data field of the victim cache line and allocating the data in the data field of the victim cache line to a writeback buffer coupled to the second level cache memory;
    (c) inquiring as to the presence of an associated cache line in the first cache memory which corresponds to the victim cache line in the second cache memory; and
    (d) upon locating an associated cache line in the first cache memory which corresponds to the victim cache line:
        (1) canceling the writeback operation and deallocating the writeback buffer coupled to the second level cache;
        (2) determining whether the status field of the associated cache line indicates a "modified" or a "clean" status; and
        (3) if the status field of the associated cache line indicates a "clean" status, updating the status field of the associated cache line to indicate a "modified" status.

4. The method according to claim 3 wherein the method further comprises the step of:

(e) writing replacement data in the data field of the victim cache line in the second level cache memory.

5. In a computer system, an apparatus for storing data written from a processor to a memory, comprising:

a memory subsystem;
    a processor capable of outputting data to be stored in the memory subsystem;
    at least first and second cache memory devices coupled together in a hierarchical manner between the processor and the memory subsystem, such that the first cache memory is coupled to the processor and the second cache memory is coupled to the memory subsystem, each of the first and second cache memories includes a plurality of cache lines wherein each of the cache lines includes a status field and a data field, each of the first and second cache devices coupled to at least one writeback buffer, a cache line in the second cache memory having a status field indicating a modified status and being denoted a victim cache line;
    said processor operating such that a writeback operation on the data in the data field of the victim cache line is cancelled when a second, associated cache line in the first cache corresponding to the victim cache line exists, where the status field of the associated cache line of said first cache memory, if it indicates a cleans status, is updated to a modified status.

6. In a computer system, an apparatus for storing data written from a processor to a memory, comprising:

a memory subsystem;

a processor capable of outputting data to be stored in the memory subsystem;

at least first and second cache memory devices coupled together in a hierarchical manner between the processor and the memory subsystem, such that the first cache memory is coupled to the processor and the second cache memory is coupled to the memory subsystem, each of the first and second cache memories including a plurality of cache lines wherein each of the cache lines includes a status field and a data field, each of the first and second cache memory devices coupled to at least one writeback buffer, a cache line in the second cache memory devices coupled to at least one writeback buffer, a cache line in the second cache memory having a status field indicating a modified status and being denoted a victim cache line;

such that a writeback operation on the data in the data field of the victim cache line is cancelled when a second, associated cache line in the first cache memory, corresponding to the victim cache line exists and said associated cache line has a status field indicating a modified status.

7. a method for reducing the number of data writebacks performed in a microprocessor system having an integrated hierarchical cache, the cache including a plurality of cache memories arranged hierarchically with the lowest level cache memory coupled to the microprocessor and the highest level cache memory coupled to a memory subsystem, and any further cache memories coupled between the lowest level cache memory and the highest level cache memory in hierarchical order, each of the cache memories coupled to at least one writeback buffer, each of the cache memories including a plurality of cache lines, each of the plurality of cache lines including a data field and a status field, where each status feild of the plurality of cache lines indicates one of a "modified" or "clean " status, one of the plurality of cache lines in a second or higher level cache memory being denoted the victim cache line and having a status field indicating a modified status, the method comprising the steps of:

(a) initiating eviction of the victim cache line in the second or higher level cache memory;

(b) initiating a writeback operation on the data in the data field of the victim cache line and allocating the data in the data field of the victim cache line to a writeback buffer coupled to the cache memory containing the victim cache line;

(c) inquiring as to the presence of an associated cache line, in one or more cache memories which are of a lower level than the cache memory containing the victim cache line, which corresponds to the victim cache line;

(d) upon locating an associated cache line in a cache memory of a lower level than the cache memory containing the victim cache line, determining whether the status field of the associated cache line indicates a "modified" or a "clean" status; and (e) if the status field of the associated cache line indicates a "modified" status, canceling the writeback operation and deallocating the writeback buffer.

8. The method according to claim 7 wherein the method further comprises the step of:

(f) writing replacement data in the data field of the victim cache line in the second or higher level cache memory.

9. A method for reducing the number of the data writebacks performed in a microprocessor system having an integrated hierarchical cache, the cache including a plurality of cache memories arranged hierarchically, with the lowest level cache memory coupled to the microprocessor and the highest level cache memory coupled to a memory subsystem, and any further cache memories coupled between the lowest level cache memory and the highest level cache memory in hierarchical order, each of the cache memories coupled to at least one writeback buffer, each of the cache memories including a plurality of cache lines, each of the plurality of cache lines including a data field and a status field, each status field, each status field of the plurality of cache lines indicates one of a "modified" or "clean " status, one of the plurality of cache lines in a second or higher level cache memory being denoted the victim cache line and having a status field indicating a modified status, the method comprising the steps of.

(a) initiating eviction of the victim cache line in the second or higher level cache memory;

(b) initiating a writeback operation on the data in the data field of the victim cache line and allocating the data in the data field of the victim cache line to a writeback buffer coupled to the cache memory containing the victim cache line;

(c) inquiring as to the presence of an associated cache line, in one or more cache memories of a lower level than the cache memory containing the victim cache line, which corresponds to the victim cache line; and (d) upon locating an associated cache line which corresponds to the victim cache line:

(1) canceling the writeback operation and deallocating the writeback buffer coupled to the cache containing the victim cache line;

(2) determining whether the status field of the associated cache line indicates a "modified" or a "clean" status; and (3) if the status field of the associated cache line indicates a "clean" status, updating the status field of the associated cache line to indicate a "modified" status.

10. The method according to claim 9 wherein the method further comprises the step of:

(e) writing replacement data in the data field of the victim cache line in the second or higher level cache memory.

* * * * *